Figure 1:
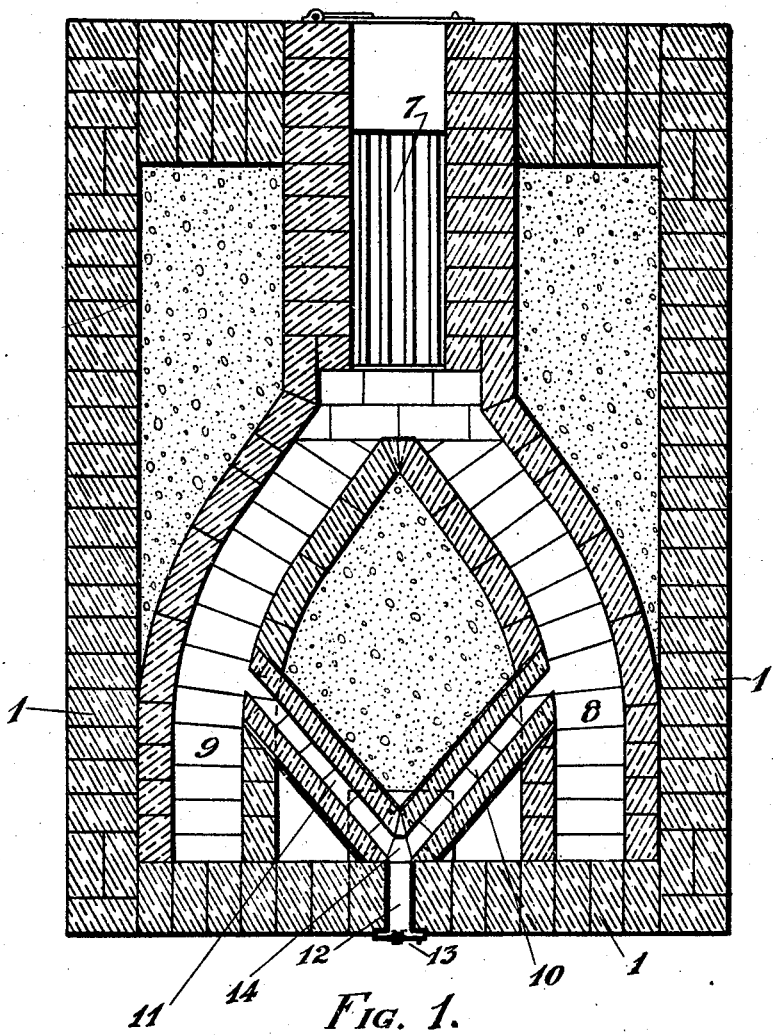

July 12, 1927.

C. W. AIRD 1,635,392

OVEN

Filed May 22, 1924

2 Sheets-Sheet 1

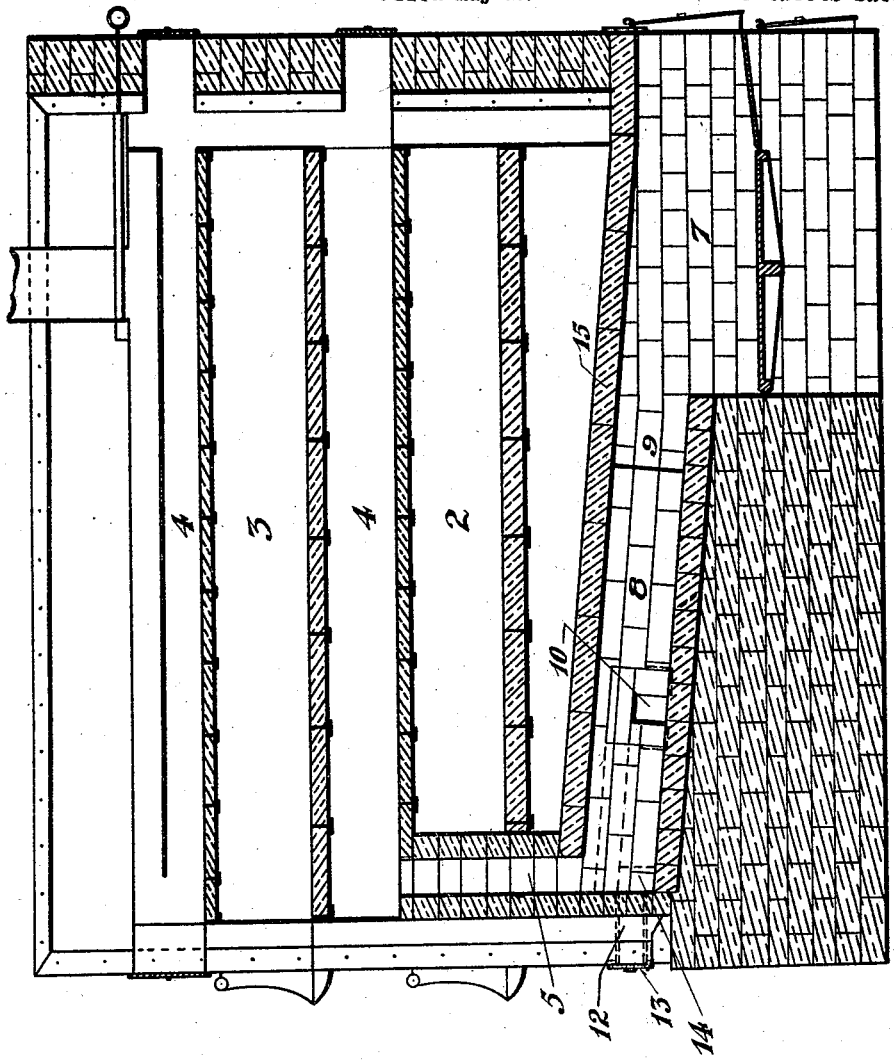

Patented July 12, 1927.

1,635,392

UNITED STATES PATENT OFFICE.

CLARENCE WILLIAM AIRD, OF BRANTFORD, ONTARIO, CANADA, ASSIGNOR TO THE BRANTFORD OVEN & RACK CO. LIMITED, OF BRANTFORD, ONTARIO, CANADA, A CORPORATION OF ONTARIO.

OVEN.

Application filed May 22, 1924. Serial No. 715,211.

My invention relates to ovens, and has for its object, a novel arrangement of flues for distributing heat uniformly to the baking chambers, and, a novel arrangement of draught check for regulating the oven temperature and controlling the fuel combustion.

In carrying out the invention a fire heated oven, which can be of any usual or approved construction, is provided with direct flues diverging from the fire box for the passage of gases to the circulating flues and with a compensating flue coupling the diverging flues interjacent the fire box and the circulating flues to maintain an even balance in the volume of gases passing from the fire box through the direct flues to the circulating flues. The oven is also provided with a draught check in communication with the compensating flue for controlling the fuel combustion and the circulation of the gases through the direct and compensating flues.

For an understanding of the invention reference is to be had to the following description and to the accompanying drawings, in which:

Fig. 1 is a sectional plan view of the oven showing the fire box and the novel arrangement of direct and compensating flues and draught check, and Fig. 2 is a fragmentary vertical elevation of the construction shown in Fig. 1.

Like characters of reference refer to like parts throughout the specification and drawings.

While the improvements hereinafter described can be used in connection with any type of a fire heated oven they are particularly directed to that type of oven comprising a plurality of baking chambers, located one above the other with horizontal flues between the baking chambers, and a fire box and direct flues, beneath the oven bottom, communicating with the horizontal flues between the baking chambers.

The oven shown in the drawings comprises an enclosing wall 1 within which are baking chambers 2 and 3. Between the baking chambers are horizontal flues 4 connected at their forward ends with vertical flues 5. Beneath the oven bottom 15 is a fire box 7, which in the construction shown is located at the rear part of the oven and is provided with direct flues 8 and 9 diverging towards the oven sides and front. The front ends of the flues 8 and 9 discharge into the vertical flues 5 and through the flues 5 into the horizontal flues 4.

The vertical, and, the horizontal flues form part of the circulating flue system and when the suction is uniform through both direct flues, all parts of the oven are uniformly heated. If the suction through the direct flues is uneven one side of the oven is apt to be heated to a higher temperature than the other side and to compensate for the uneven suction and maintain a uniform distribution of heat at both sides of the oven bottom the direct flues are coupled by a compensating flue consisting of two converging arms 10 and 11 connected with the direct flues 8 and 9 interjacent the fire box 7 and the vertical flues 5.

Assuming that the suction through the flue 8 is greater than through the flue 9, then that part of the oven above the flue 8 will be heated to a higher temperature than that part of the oven above the flue 9. With the compensating flue, consisting of the converging arms 10 and 11, coupling the direct flues 8 and 9, the suction through the flue 8 will create an equal suction through the flue 9 from the fire box to the converging arm 11, and a part of the products of combustion from the flue 9 will pass into the converging arm 10 and flue 8 while the remainder of the products of combustion in the flue 9 will pass to the corresponding vertical flue 5. The suction thus created through the flue 9 will be equal to the suction through the flue 8 and both sides of the oven as a consequence will be uniformly heated. Once the suction through the flue 9 is properly established the passage of the products of combustion through the two flues will be evenly maintained with a corresponding maintenance of even temperature through all parts of the oven. The compensating flue not only establishes and maintains a uniform suction through the direct flues 8 and 9 but it also operates to heat that part of the oven, lying between the direct flues, to the same temperature as the sides of the oven are heated.

Through the agency of the fire box, the diverging flues, and the compensating flue, the heated products of combustion are so distributed as to maintain a uniform temperature across the entire area of the oven bottom and heat all parts of it evenly.

To control the temperature of the oven and to regulate the combustion of the fuel, the compensating flue is provided with a draught check 12 having a movable damper 13. The draught check 12 enters the compensating flue at the angle 14 of convergence so that it will control both converging arms 10 and 11 and flues 8 and 9.

I have constructed several ovens with this arrangement of flues and draught check and have been able to accurately control the temperature of the baking chambers to the desired degree and I have also been able to maintain the fires for a considerable period of time without replenishing the fuel supply.

Having thus fully described my invention what I claim as new and desire to secure by Letters Patent is:

1. An oven comprising an oven bottom, a fire box, and direct and compensating flues beneath the oven bottom, the direct flues diverging, from the fire box, to circulating flues in communication with the ends of the diverging flues remote from the fire box, the compensating flue consisting of two converging arms connecting the diverging flues interjacent the fire box and the communicating flue, and a draught check communicating with the compensating flue.

2. An oven comprising an oven bottom, a fire box and direct and compensating flues beneath the oven bottom, the direct flues diverging, from the fire box, to circulating flues in communication with the ends of the diverging flues remote from the fire box, the compensating flue consisting of two converging arms connecting the diverging flues interjacent the fire box and the communicating flue, and a draught check communicating with the compensating flue at the angle of convergence of its two arms.

3. An oven comprising an oven bottom, a fire box beneath the oven bottom, vertical flues at the opposite end of the oven to the fire box, two horizontal flues beneath the oven bottom diverging from the fire box to the vertical flues, and a flue consisting of two converging arms connecting the horizontal flues interjacent the fire box and the vertical flues for creating a suction from one of the horizontal flues to the other and maintaining an even distribution of heat at both sides of the oven bottom.

Dated at the city of Toronto, in the county of York, and Province of Ontario, Dominion of Canada, this 7th day of May, A. D. 1924.

CLARENCE W. AIRD.